United States Patent Office 3,764,280
Patented Oct. 9, 1973

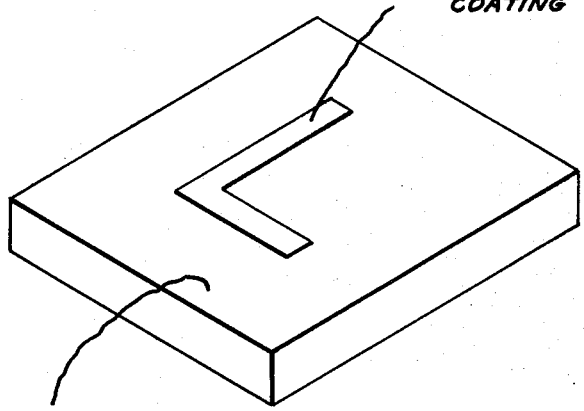
Fig.1. ELECTRONICALLY CONDUCTIVE COATING
SUBSTRATE HAVING ELECTRICAL INSULATING PROPERTIES
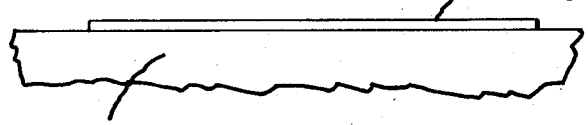
Fig.2. ELECTRONICALLY CONDUCTIVE COATING
SUBSTRATE HAVING ELECTRICAL INSULATING PROPERTIES
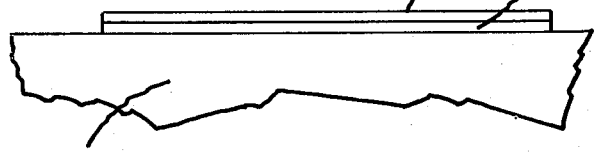
Fig.3. METAL COATING
ELECTRONICALLY CONDUCTIVE COATING
SUBSTRATE HAVING ELECTRICAL INSULATING PROPERTIES
Inventor:
John H. Lupinski,
by James W. Chilewood
His Agent.

3,764,280
ELECTROCONDUCTIVE COATINGS ON
NON-CONDUCTIVE SUBSTRATES
John H. Lupinski, Scotia, N.Y., assignor to
General Electric Company
Application Feb. 10, 1969, Ser. No. 800,823, which is a
continuation-in-part of application Ser. No. 710,071,
Mar. 4, 1968, both now abandoned. Divided and this
application Nov. 2, 1970, Ser. No. 86,029
Int. Cl. B01k 1/00
U.S. Cl. 29—195                                    14 Claims

ABSTRACT OF THE DISCLOSURE

Powdered oxides or hydroxides, including hydrated oxides, of cadmium, indium, lead and zinc, individually or as mixtures are dispersed in an elastomer. Such dispersions are used to make surface coatings on non-conductive substrates and the metal compound in these coatings is reduced to metal by chemical or electrochemical means to produce surfaces which are highly conductive. When desired, these compositions can be plated to produce metal surfaces on the non-conductive substrate for either decorative or utilitarian purposes.

CROSS-REFERENCES TO RELATED APPLICATIONS

This application is a division of my then copending but now abandoned application, Ser. No. 800,823, filed Feb. 10, 1969, as a continuation-in-part of my then copending but now abandoned application, Ser. No. 710,071, filed Mar. 4, 1968, both of which are assigned to the same assignee as the present invention.

BACKGROUND OF THE INVENTION

This invention relates to a process of making an elastomeric coating possessing electronically conductive properties on an electrically non-conductive substrate, to a process which uses the compositions so produced to make metal plated objects and to the products produced by these processes. More particularly, this invention relates to coating an electrically non-conductive substrate with a composition comprising an elastomer having dispersed therein oxides and/or hydroxides, including those hydroxides which are generally considered as being hydrated oxides, of cadmium, indium, lead and zinc, thereafter reducing these metal compounds to metal on at least a portion of the coating and, if desired, using such compositions for producing metal plated articles.

FIELD OF THE INVENTION

Synthetic polymers, as a general class, are electrical insulators. In fact, it was this property which gave birth and strong impetus to the development of the synthetic polymer industry, since there was a need for materials which could be used as electrical insulation. With the development of the electrical industry, need arose for materials which, although not as good conductors as metals, would have sufficient conductivity that they could be used, for example, as corona shields, or could be incorporated as a separate layer in the insulation to prevent corona discharge which is undesirable since it causes complete breakdown of the electrical insulation. Also, with the development of the synthetic polymer industry, use of these materials in applications other than electrical applications arose for decorative and utilitarian purposes, for example, coatings, synthetic fibers, films, etc.

Because of the electrical insulating nature of these polymers, articles fabricated from such fibers and films have the annoying property of accumulating static charges on their surfaces, which tend to cause dust from the air as well as to cause other materials to cling to their surfaces. Many attempts have been made to provide such articles with a surface which would dissipate the electrostatic charge so that the articles would not be so prone to building up static charges. Conductive surfaces are also desirable for electroplating non-conductors for decorative and utilitarian purposes, for example, decorative designs, printed circuits, etc. Applications have also arisen where it is desirable to make compositions such as conductive fabrics, especially in the form of conductive tapes which have a particular conductivity so as to control the amount of electric current flowing in the circuit incorporating such a composition.

DESCRIPTION OF THE PRIOR ART

Many attempts have been made to develop synthetic polymers which would be electronically conductive. When synthetic ion exchange resins were developed, it was hoped that these products would find application for conductive polymers. However, it was soon discovered that under the influence of an electrical potential, much of the conductivity was ionic in which the ionic groups of the polymer migrated either toward the anode or cathode depending on the particular charge of the ionic group in the polymer. This is an undesirable property, since it depletes the ionic groups from the internal structure of the polymer with a consequent increase in resistance and degradation of the polymer.

Other approaches to the problem have been to incorporate metallic or other conductive fillers such as carbon blacks in polymers, to produce compositions having conductive properties. Since the amount of filler determines the conductivity of the composition, the maximum conductivity of such compositions is dependent upon the highest amount of the conductive filler which can be incorporated in the composition without adversely affecting the mechanical properties of the compositions. Although these compositions are electrically conductive, they have the disadvantage that, when they are electroplated, the quality of the metal plate and the ability to plate is dependent on the density (number per unit of surface area) of the conductive particles in the surface which have at least a portion of their surface not covered by the polymer matrix. Furthermore, the adhesion of the plated metal to the substrate is generally very poor, especially if carbon is the conductive filler. Even with metal particles as the filler, adhesion does not meet the requirements for plated articles for many of the commercial applications. Furthermore, metal particles are difficult to disperse and keep suspended in the paint or lacquer and the metal particles generally are available in such a coarse size that, even after plating with another metal, buffing and polishing is required to produce the desired finish.

In the last several years there has veen a great upsurge in the production of metal plated plastic parts. As mentioned, plastic parts had been plated by first coating the desired area with an electrically conductive lacquer or paint, usually containing either carbon or metal powders as a filler in sufficient quantities to provide a surface which could be electroplated. However, both the adherence of the conductive lacquer to the substrate as well as the plated metal film to the conductive lacquer left a great deal to be desired. In use, the plated metal would peel or blister from the plastic surface either due to failure of the bond between the metal and the conductive lacquer or by failure of the bond of the conductive lacquer to the substrate. This failure was especially evident when the plated object was subjected to fluctuations in temperature.

To overcome this problem, special plastics were developed which by chemical treatment of the surface permitted deposition of a thin film of metal by electroless plating techniques followed by deposition of a thicker metal coat by electroplating techniques. Although this method does overcome the peeling of the metal plate during use, it still requires the use of special plastics and is extremely time consuming and expensive.

SUMMARY OF THE INVENTION

It is an object of my invention to provide a composition which can be used to produce an article having sufficient electrical conductivity at least on a portion of its surface that it may be plated by either electroplating or electroless plating techniques.

It is another object of this invention to provide a composition which can be used to produce a highly electronically conductive surface coating on the desired area of any desired electrically non-conductive substrate, for example sheets, plates, films, fibers or other shaped articles.

It is still another object of my invention to provide improved metal plated objects made from an electrically non-conductive material.

It is a still further object of this invention to provide the process for accomplishing the above stated objectives.

These and other objects and the advantages of this invention will become apparent from the following description and the appended claims.

With the above objects in view, the present invention relates to a composition comprising an elastomer having dispersed therein a powdered metal composition selected from the group consisting of the oxides and hydroxides, including those hydroxides more generally considered as being hydrated oxides, of cadmium, indium, lead and zinc, including mixtures thereof, and to the process of using such compositions to produce an article having at least a portion of its surface which is sufficiently electronically conductive to permit plating of such surfaces with a metal.

BRIEF DESCRIPTION OF THE DRAWING

The invention will be better understood from the following description taken in conjunction with the accompanying drawing in which:

FIG. 1 is an isometric view of a substrate having electrical insulating properties on which a design has been formed within the scope of the present invention.

FIG. 2 is a cross-sectional view of a substrate having electrical insulating properties, having on its surface an adherent coating, enlarged to show detail of the polymer composition within the scope of the present invention.

FIG. 3 is a cross-sectional view of a substrate having electrical insulating properties, having on its surface an adherent coating of electronically conductive polymer upon which an adherent coating of metal has been deposited within the scope of the present invention.

DESCRIPTION OF THE PREFERRED EMBODIMENTS

I have now discovered that electronically conductive polymers can be made by dispersing an oxide or hydroxide of cadmium, indium, lead and zinc or mixtures thereof in an elastomer. Other materials, for example, dyes, pigments, fillers, flow control, e.g., thixotropicizing agents, etc., as well as vulcanizing or curing agents for the elastomer can be present, if desired. However, as explained later, the amount of elastomer should be sufficient to provide film forming properties to the compositions and the amount of metal oxide or hydroxide should be sufficient that the metal compound in a film made from the compositions can be electrolytically reduced to metal.

As previously mentioned, the metal compounds that I can use to incorporate in the elastomeric matrix are the oxides and hydroxides, including those hydroxides which generally are considered hydrated oxides, of cadmium, indium, lead and zinc. These compounds must be capable of being ground to fine powders so that they can be readily dispersed in a solution of the elastomer and the films or coatings prepared therefrom will be smooth. Cadmium and zinc form well defined hydroxides which can be ground to powders. The hydroxides of indium and lead are not well defined compounds and generally are considered to be hydrated oxides. Since all of these hydroxides and hydrated oxides are readily converted to oxides by heating to relatively low temperatures, and they require longer times to be reduced to metal in my process and since the oxides are more readily available as a commercial product, I prefer to use the oxides of the four metals.

Lead oxides are commercially available in various states of oxidation. The so called black oxide or suboxide is actually a mixture of PbO and varying amounts, generally 10–15% by weight of free lead. The other oxides PbO, $Pb_3O_4$ and $PbO_2$ are true oxides. The later two oxides are oxidizing agents which have an adverse effect on the elastomer matrix. Furthermore, they do not reduce as readily to metal as PbO. Therefore, PbO, either as such and known as litharge and massicot or as the black oxide, is the lead oxide which I prefer and designate as the oxide of lead (II) or as lead (II) oxides.

Although indium oxides are known in various states of oxidation, e.g., $In_2O$, $InO$, $In_2O_3$ and $In_3O_4$, $In_2O$ and $InO$ are prepared by reduction of $In_2O_3$ and are readily oxidized to $In_2O_3$ and $In_3O_4$ is said to be a mixture of $In_2O_3$ and $InO$. Unlike lead, the indium oxide in the highest state of oxidation, $In_2O_3$, is not an oxidizing agent and reduces to metal in my process as readily as do the other indium oxides. Therefore, any of the oxides of indium can be used in my compositions, but $In_2O_3$ is preferred because it is the most readily available.

Both the oxides of cadmium and zinc are known only in one oxidation state, CdO and ZnO, and both readily reduce to metal in my process. CdO and $In_2O_3$ are unique in my compositions since the fibers, films and coatings, etc., containing either one or both of these oxides have semiconductive properties whereas fibers, films and coatings, etc., containing their hydroxides or the zinc or lead compounds have such a high resistivity that for all practical purposes they are insulators. Surprisingly enough, they can be reduced to metals by my process, but preferably by the separate electrochemical step described hereinafter. Where the technique of simultaneous reduction and plating is used, CdO or $In_2O_3$ is preferred with CdO being the preferred species since it is considerably less costly.

Compounds and especially dusts and powders of cadmium and lead compounds are highly toxic. Therefore, extreme care is needed in handling these materials. Because zinc oxide and hydroxide are not considered toxic they are preferred from this standpoint. Of all the metal compounds I can use, zinc oxide is preferred. It is non-toxic and is readily available as a very fine powder at low cost. Like the other metal compounds, it is readily dispersed in the solution of the elastomer, which can be used to produce very smooth coatings, and the zinc oxide in the coating can be readily reduced to provide a smooth, highly conductive coating that is readily electroplated. The electroplated metal is very adherent to the substrate.

Surprisingly enough, I have found that other metal compounds, for example, metal oxides, sulfides, etc., or conductive carbon blacks cannot be used in place of the oxides and hydroxides of cadmium, indium, lead and zinc. Such a substitution leads to compositions which, in most cases, can not be electroplated, and, in those few cases where the composition can be electroplated, the metal plate has poor adherence and, generally, can be readily peeled from the conductive coating. Where the maximum peel strength obtainable by the use of my metal compounds, i.e., cadmium, indium, lead or zinc oxides or hydroxides alone in the compoistion is not required, these other materials can be used in conjunction with and as diluents for my metal compounds to reduce the cost. However, when so used, they generally should not be used in amounts exceeding 25% by volume of the combined volume of such diluent and my metal compound in order to maintain satisfactory adherence of the subsequent electroplated metal.

When an object, at least a portion of whose surface has been coated with my composition, is placed in an electroplating bath with the surface coating as the cathode, there are several competing reactions which occur. If the plating bath contains either an acid or a chelating or complexing agent there is some tendency for the metal compound to dissolve. This tendency to dissolve is much less if the bath is neutral or alkaline and either free of complexing agent or the amount of complexing agent is not in great excess of that required to complex the metal ions already in the plating solution. Therefore, it is desirable to use neutral or alkaline plating baths to minimize the dissolution of the metal compound. The chief and desired reaction is that the metal compound is first reduced to free metal and thereafter the metal ions of the plating bath are deposited as an adherent metal plate on the surface of the metal particles produced by reduction of the metal oxides. These reduction and plating reactions start at the point where electrical contact has been made and spread outwardly until the entire surface initially containing the metal compound is plated with metal. By use of multiple connectors for the conductive surface to the cathode, it is possible to cause the reduction and plating to occur at each connection and spread until each plated area merges with the others.

When the metal compound containing composition was a surface coating or film on a transparent substrate and was in the order of one to two mils thick, surprisingly I noticed that when I electroplated the object, the reduction of the metal compound to metal occurred not only on the surface, but through the entire thickness of the coating and that the metal which was plated also penetrated into as well as plated on the surface, thereby forming an extremely adherent metal plate on such objects. This observation was visible since the color of the coating due to the metal compound was replaced by the gray color of the metal. Surprisingly enough, the bond between the elastomer and the metal particles produced by the reduction of the dispersed metal compound is not noticeably affected by the reduction.

I also surprisingly discovered that when an object whose surface has been coated with any one of these metal compounds containing composition is placed in any of the various electroless plating baths which have a reducing agent, that, after an induction period, such a surface is catalytically active and causes the metal ions in the electroless plating solution to be deposited as an adherent metal plate over the entire surface of the coating in contact with the solution. Whether or not the reducing agent contained in such electroless plating solutions first reduces some of the metal compound to metal which is then the active catalytic agent causing the electroless plating reaction to occur is not known, but it is a distinct possibility. Observations do indicate that if such a reducing reaction does take place, it does not take place to the depth that is noted when the metal plate is formed in an electroplating solution. On the other hand, the fact that the metal plating does not start immediately in the electroless plating bath but only after an extended time indicates that metal plating does not start in the electroless plating bath until the reducing agent present has, at least partially reduced the particles of the metal compound to metal at the surface of the coating.

Since the metal plating by electrochemical means occurs only after the metal compound has been reduced to metal, there tends to be a somewhat thicker deposit near the electrical connection which diminishes in thickness outward since this is the way the metal compound is reduced to the metal. However, this variation in thickness is not pronounced. As mentioned above, when electroless plating techniques are used, there is a delay before the metal in the electroless plating bath does start to plate on the object, but when it does occur, it occurs over the entire surface of the coating containing the metal compound which is in contact with the solution. In order to speed up both the electroplating and electroless plating procedures, I have found it highly desirable to first reduce the metal compound to metal at least on the surface of the coating by cathodic treatment with an electrolyte. Such reduced coatings are catalytically active for the electroless plating reaction and generally, are highly conductive. Electroplating or electroless plating occurs immediately over the entire coated surface which has been so reduced.

Although any aqueous electrolyte which will produce hydrogen at the cathode is satisfactory for the reduction, the preferred electrolyte is an alkaline or neutral electrolyte, for example, an aqueous solution of an alkali metal hydroxide, carbonate or bicarbonate, or an alkali metal salt of a mineral acid, preferably $H_2SO_4$. These solutions are cheap, readily available and also cause no harmful dissolution of the metal compound during the cathodic treatment as can occur with an acidic electrolyte. As was noticed during electroplating of the metal compound containing compositions, cathodic treatment will completely reduce the metal compound to metal throughout a thin film or coating without interfering with the adhesion between the particles and the elastomeric matrix.

The reduction into the layer occurs at a slower rate than the reduction on the surface. Therefore, when thick coatings or films are reduced either as a separate step or during the plating reaction, surface reduction will be completed first, but not to the exclusion of some reduction into the coating. If desired, continuing the reduction reaction will produce free metal in at least the first ten mils below the surface. For electroplating or electroless plating, only surface reduction is necessary, but the simultaneous reduction into the coating materially increases the adhesion of the metal plated layer.

When it is desired to produce a highly conductive surface or to plate a metal on such surface by either electroless or electroplating techniques, I prefer to prereduce the metal compound to metal at least on the surface of the particles of metal compound in the surface of the object. Such a technique eliminates any chance of causing spotty plating due to possible leaching of the metal compound from a particular area prior to being reduced to the free metal, thereby causing such spot to be non-conductive. However, such pretreatment, although highly desirable, is not essential. High quality plated articles have been obtained without the prereduction step.

As mentioned above, it was indeed surprising to find that I could reduce the metal compounds to metal even below the surface of the coating without harming the bond between the particles and the elastomeric matrix and thereby, greatly increase the peel strength of the metal layer subsequently deposited on the surface. In a standard peel strength test, it is found that when the metal is finally peeled from the plated object that the elastomeric matrix is still tightly adherent to the underside of the metal film which is peeled off.

In my study of various binders for the metal compounds, I was indeed surprised to find that only those polymers known as elastomers gave satisfactory results. Other polymers, for example, polycarbonates, polystyrene, polyvinyl chloride, epoxy resins, etc., although they could be used in the same way to produce metal plated articles, the metal plate was quite readily peeled from the substrate which is in marked contrast to the high peel strength obtained with the general class of elastomers.

Still further improvement in peel strength is obtained by using a solvent, a mixture of solvents or a mixture of solvents and non-solvents to dissolve such elastomers which are capable of solvent-attacking, without deleteriously affecting, the substrate onto which the metal compound containing composition is to be coated. Where the solvent does not attack the substrate, as for example when using ceramics, glass, or thermoset substrates, good adhesion is obtained by the technique of roughening the surface, for example, by sand blasting, abrading, etc. Where maximum adhesion to a substrate is desired, the substrate should be one which will be attacked, but not deleteriously, by the solvent used in the coating composition. In general, aromatic hydrocarbons and aromatic halohydrocarbons are good solvents for the 1,3-butadiene elastomers and highly polar solvents, e.g., dimethyl formamide, dioxane, etc., are good solvents for the polyurethane elastomers. Monomeric acrylonitrile is an excellent adjuvant to use with aromatic hydrocarbons to dissolve the elastomeric copolymers of butadiene with acrylonitrile. These solvents can be diluted with other solvents which have higher or lower solvent or even non-solvent properties for the elastomer in order to obtain desirable evaporation rates or desirable degree of solvent attack on a particular substrate. For example, a solvent which detrimentally attacks a substrate can be used in minor amounts with other solvents for the elastomer which have little or no effect on the substrate.

Examples of elastomers which I have found highly desirable, are those elastomers which are polymers of 1,3-butadienes. These can be homopolymers or copolymers (graft, block, random, etc.) with other polymerizable monomers. Other classes of elastomers which are desirable are those known in the art as polymeric urethane elastomers, silicone elastomers, chlorosulfonated polyolefin elastomers, etc.

Specific examples of elastomers that I can use are polymers of 1,3-butadiene alone or copolymerized with other polymerizable monomers, for example, styrene, acrylonitrile, butene, etc., natural rubber, polymers including copolymers of isoprene, polymers including copolymers of 2-chloro-1,3-butadiene, etc. These polymers are used in their thermoplastic form, i.e., they are still solvent-soluble and have not been cross-linked or vulcanized to their insoluble, infusible state. However, vulcanizing or curing agents can be incorporated and the compositions vulcanized or cross-linked later.

The polymeric urethanes are generally the reaction products of a dihydroxy compound and a diisocyanate. In this form, they are thermoplastic and readily soluble in a wide variety of solvents. The commercially available products are generally made by using a dihydroxy compound which is either a polyester or a polyether having molecular weights in the general range of 500–5000 which are then reacted with the diisocyanate to produce a high molecular weight polymeric urethane. Incorporation of either a small amount of a hydroxy compound such as glycerine, trimethylol propane, sorbitol, etc., or a small amount of a polyisocyanate containing more than two isocyanate groups, will cause these polymers to be cross-linked and thereafter, they are insoluble products. If it is desired to use such cross-linked products in producing the metal compound filled compositions, the cross-linking or curing agent is added to the composition just prior to use and the films, fibers, surface coatings, etc., are made before the composition cures.

The silicone elastomers can be any of those disclosed in U.S. Pat. 2,867,603 and the patents listed therein and may be blended with other elastomers as disclosed therein. Uncured silicone elastomers and blends with the other elastomers are readily soluble in liquid aromatic hydrocarbons. These references also disclose various means of curing these compositions. The preferred silicone elastomers are the polydimethylsiloxane and polymethylphenylsiloxane elastomers.

The chlorosulfonated polyolefin elastomers can be any of those disclosed in U.S. Pat. 2,416,060 and 2,416,061 which also disclose methods of curing. Blends of these polymers with other elastomers which I can use are disclosed in U.S. Pat. 2,729,608 which discloses methods of curing such compositions. Prior to curing, the chlorosulfonated polyolefins and the blends with other elastomers are readily soluble in liquid aromatic hydrocarbons. The preferred and most readily available chlorosulfonated polyolefin elastomers are chlorosulfonated polyethylenes. The above as well as other elastomers known in the art are satisfactory for making my conductive compositions.

From what has been said above, it is apparent that these elastomers must initially be soluble in a suitable solvent, i.e., they are solvent-soluble elastomers. If the composition is to be used to make molded or shaped articles, the metal oxide or hydroxide can be dispersed in the elastomer by milling the elastomer on different rolls and adding the metal compound to be elastomer or by use of other compounding equipment common in the rubber and plastic compounding art, e.g., Banburying, etc. These solid dispersions of the metal compound in the elastomer can be shaped by conventional extrusion, molding, sheeting, laminating, etc., techniques to produce shaped articles.

If the composition is to be used as a paint to surface coat other objects, to wet-spin fibers, etc., the dispersion is most conveniently made by first dissolving the elastomer in a suitable solvent. If, for any reason, the solution contains any gel particles of the elastomer that will not dissolve, the solution, preferably, is filtered to remove the gel particles to insure that they will not be present in the final composition. The metal compound is dispersed in the solution by standard paint making techniques for dispersion of pigments in paints, e.g., paint mill, ball mill, rod mill, etc., to insure breaking up of any agglomerates of the powdered metal compound.

As will be obvious to those skilled in the art, the amounts of elastomer and metal compound in the final objects made from either the solid or liquid dispersions should be within certain practical limits. If too much metal compound is present, then the amount of elastomer will not be sufficient to bind the particles of the metal compound together into a cohesive mass nor form a cohesive film or coating on a substrate. The maximum amount of metal compound that can be incorporated is not readily expressed as a percentage since it is dependent on the particle size, nature of the binder, etc. As a general guideline, but not as a strict limitation, the metal compound generally should not exceed 60% by volume of the total volume of the solids content of the composition to obtain best results. However, the critical limit is determined by the amount of elastomer required to provide cohesive film forming properties to the composition, i.e., the solid dispersion can be formed into a coherent sheet or film and the liquid dispersion can be formed by casting, spraying, painting, etc., into a coherent film or coating.

It is also apparent that the electrical conductivity after reduction will be adversely affected if the amount of metal compound is too low, i.e., the amount of elastomer is so high that the individual metal particles are completely encapsulated in the elastomer matrix. The minimum requirement for the amount of metal compound dispersed in the elastomer is best expressed as the amount sufficient that a film made from such a composition can be electrolytically reduced to metal. The percentage required varies dependent again on the size of the particles, the nature of the binder, the degree of dispersion, the thickness of the coating, etc. Coatings of the order of 0.1 mil or less in thickness take much longer time to be electrolytically reduced or plated than coatings at least 1 mil in thickness. As a general guideline, but not as a strict limitation, the amount of metal compound should be at least 20% by volume of the solids in the composition when another conductive solid, e.g., conductive carbon, semi-conductive copper oxide, molybdenum dioxide, etc., is also present, and at least 25% by volume when another conductive solid is absent from the composition. As a general rule, when the metal compound is present in less than these amounts, reduction or plating proceeds at such a slow rate that any savings in metal compound is dissipated in the cost of longer process time and, if electrolytical means are used, power inefficiency. Where the highest conductivity is desired in the reduced metal containing film and the optimum properties are desired in the plated metal film, the metal compound should be present in amounts of 30 to 50% by volume and the elastomer in amounts of between 70 to 50% by volume.

The oxides and hydroxides of indium, cadmium, lead and zinc are readily available as powders having particle sizes in the order of one to two microns or smaller. The finer the particle size, the smoother the metal coat will be which is plated on top of the conductive coating. If a mirror-like finish is desired, this can readily be obtained by the use of particle sizes in the order of one to two microns. If a mat-like finish is desired, then particle sizes up to 10 microns can be used with rougher finishes being attained with larger particle sizes.

After the metal compound is dispersed, the mixtures are used to surface coat any desired non-conductive substrate by techniques such as spraying, dipping, brushing, roller coating, silk screening, etc., to either coat the entire surface or only certain specific areas as desired. Prior to application, curing agents for the elastomers may be incorporated, if desired, so that the coating can be cured or vulcanized to the insoluble and infuseable state. If desired, solutions of the polymers may be spun by wet spinning methods to produce fibers.

The solution can be cast upon a highly polished metal belt to produce films which are stripped after evaporation of the liquid to produce self-supporting films. When the metal compound is cadmium oxide or indium oxide, the films, fibers or surface coatings can be used where it is desired to have a surface which is semi-conductive, for example in corona shields for static sleakage purposes, etc. The solid dispersions may be shaped by any conventional means into the desired shape.

As previously mentioned, the objects may be directly introduced into an electroplating bath to produce a highly conductive metal plated object, but preferably, the metal compound is prereduced by cathodic treatment previously described to produce a highly conductive surface which is useful per se, for example, as a heating element, etc., as an electrical conductor, or as a base upon which another metal is plated to produce either decorative or utilitarian metal surfaces on the particular objects. Once a metal surface is produced by either electroplating or electroless plating technique, one or more additional metals may be plated on top of this metal if desired. The conductive fibers, so produced, either prior to or after having a metal plated thereon may be made into woven fabrics, etc. The above aspects of the invention are illustrated in the drawing.

FIG. 1 illustrates one embodiment of my invention whereby a decorative design, for example, a letter, is formed on a non-conductive substrate. In making the design, the non-conductive substrate can be coated with the metal compound filled polymer described herein, only in those areas where a metal is later to be deposited. If desired, a greater area may be coated and reduced and then masked so that the plated metal will only be deposited where desired. This latter technique would have some conductive polymer surface unplated by the metal. In making an electrical circuit, e.g., a printed circuit board, by the technique of this invention, it would generally not be desirable to have the unplated conductive polymer coating bridge between and short circuit the plated circuit. However, such a technique of using both unplated and metal plated conductive circuits can be used to take advantage of the difference in conductivity, e.g., in a shunt.

Instead of plating a design, the entire exposed area of an object, e.g., a knob, handle, fiber, rod, etc., can be plated with the metal and then if desired by still one or more other metals, for example, silver, nickel, chromium, gold, platinum, zinc, brass, cobalt, etc.

FIGS. 2 and 3 illustrate certain of the abovedescribed embodiments of my invention. In these figures, the thickness of the layers have been greatly enlarged for clarification.

FIG. 2 shows the metal compound filled coating applied to a selected area of the surface of a substrate having electrical insulating properties, i.e., a nonconductive base member. The actual area covered by the coating can be any that is desired to form plain or intricate designs. As such, it can be used as an electrical circuit on the insulating member or plated with a metal, as shown in FIG. 3, to form decorative patterns or useful designs such as printed circuits.

These and other embodiments of my invention will be readily apparent to those skilled in the art from the above description and the following specific examples.

In order that those skilled in the art may better understand my invention, the following examples are given by way of illustration and not by way of limitation. In all the examples, percentages are designated by wt. percent for percentages by weight and by vol. percent for percentages by volume.

EXAMPLE 1

This example illustrates how the conductivity can be varied by varying the amount of metal compound incorporated in the polymer matrix. A solution was made of a polymer of 2-chloro-1,3-butadiene, hereinafter referred to as chloroprene elastomer (Neoprene AD-10), in a solvent containing 50 vol. percent heptane, 25 vol. percent toluene, 15 vol. percent benzene and 10 vol. percent monochlorobenzene. Quickest dissolution was obtained by dissolving the elastomer in the aromatic components of the solvent mixture and then adding the heptane. Using this as a stock solution, cadmium oxide, having an average particle size of 1 micron, was added in amounts sufficient to give dispersions containing 20, 25, 30, 35, 40, 50 and 60 vol. percent of cadmium oxide based on the total volume of the metal oxide and elastomer and ball milled to give a smooth dispersion. These dispersions were used to evenly surface coat one side of transparent, 2 x 3 x ⅛ inch test plaques molded from a polycarbonate resin (Lexan). After drying, the coatings were approximately 1 mil in thickness. Measurements showed that there was no noticeable difference in conductivity in the coatings containing at least 40 vol. percent cadmium oxide but it decreased below this amount. The conductivity of the coatings containing 20 and 25 vol. percent cadmium oxide was too low to measure with a resistance meter.

Each of these plaques was made the cathode in an aqueous potassium hydroxide solution (10 g./liter) with electrical contact being made by means of a clip to one edge of the coating. The samples were immersed in the electrolytic bath with the bottom of the clip just touching the surface of the electrolyte. A potential of 2.5 to 3 volts was applied which caused bubbles of gas to form on the clip. Because of the reducing action taking place, the nature of the cathode changes causes the potential to decrease. To compensate for this, the potential was adjusted to keep the potential essentially constant during the entire reduction process. The reduction of the cadmium oxide to cadmium metal initially occurred at the clip and slowly spread over and into the entire coating at a rate which was dependent on the metal oxide content of the coating. This was visible since the brown color of the coating, which is due to the cadmium oxide, turned to gray as the oxide was reduced to metal.

Those coatings having at least 40 vol. percent cadmium oxide reduced over the entire area of approximately 6 sq. inches in a period of 30 minutes. The coating containing 25 vol. percent cadmium oxide required overnight to be reduced. Only about one square inch of the coating containing 20 vol. percent cadmium oxide had been reduced in 16 hours. Although the cadmium oxide in such a coating can be reduced to metal, the cost of electricity would outweigh the cost of the additional amount of cadmium oxide needed. Conductivity measurements showed that the reduced film initially containing 40 vol. percent cadmium oxide was essentially the same as that containing a higher amount, but decreased below this amount. Surprisingly enough, the film initially containing only 25 vol. percent of cadmium oxide showed hardly any conductivity at all even after reduction. However, it readily plated copper as did those coatings initially containing higher amounts of cadmium oxide.

Copper plating of the coatings was done by giving an initial copper strike of approximately 0.1 mil of copper in a standard alkaline copper cyanide solution followed by plating a coating of approximately 2 mils by using a commercially available acidic bright copper plating solution to give mirror-like copper coatings on the polycarbonate plaques. All of these copper coatings were very adherent and could not be peeled from the plaque except by rupturing the chloroprene coating, showing that the adhesive strength of the elastomer to the substrate and the adhesive strength of the elastomer to the copper plating was greater than the cohesive strength of the elastomer. The force required to peel the copper plating from the coating composition initially containing 60 vol. percent cadmium oxide was not as great as that required to peel the coating of those containing a lesser amount of metal oxide showing that the higher loading with metal oxide had decreased the cohesive strength of the coating layer. In view of both the conductivity and peel strength results, it is evident that there is no advantage to be gained by using a metal compound loading in the elastomer exceeding 35 to 50 vol. perecnt, since best reesults are obtained in this range and less metal compound has to be used.

When the test using 20 vol. percent cadmium oxide was repeated except that 2.2 vol. percent of a conductive carbon black was also incorporated into the composition, results similar to those obtained using 25 vol. percent of cadmium oxide were obtained. This is also true when copper oxide and lead sulfide are each used in place of the carbon black.

In all of the above tests, the peel strength was determined using a tensile testing machine and a cross-head speed of 5 inches per minute. A one inch wide by 3 inch long test strip was cut wtih a razor blade. One end was lifted by means of a razor blade for a sufficient length to attach it to the gripping jaw. All of the plated samples gave peel strengths of about 5 to 9 lbs. per inch. Even higher peel strengths were obtained, exceeding 10 pounds per inch, by heating the plated sample at 80° C., for 12 hours.

EXAMPLE 2

This example illustrates that an elastomer must be used as a binder for the metal compound. The following solutions were prepared, each containing 10 g. of the stated polymer in 100 ml. of a solvent. After solution was obtained, sufficient powdered cadmium oxide having an average particle diameter of 1 micron was dispersed in the solution to give a 40 vol. percent dispersion of cadmium oxide based on the total volume of the polymer and metal oxide. The compositions are shown in the following table.

TABLE 1

| Composition | Polymer | Solvent (ratios are by volume) |
|---|---|---|
| A | Polyurethane elastomer [1] | Dioxane. |
| B | Polyester [2] | Do. |
| C | Polycarbonate [3] | 1,1,2-trichloroethane. |
| D | Polyvinyl chloride | Methyl ethyl ketone. |
| E | Polyvinyl acetate | Methyl ethyl ketone-toluene (1:1). |
| F | Epoxy resin [4] | Toluene—n-butanol (2:3). |
| G | Ethylhydroxyethylcellulose | Mineral spirits—isopropanol (95:5). |
| H | Butyl rubber: (a) polyisobutylene; (b) copolymer butadieneisobutylene. | Chlorobenzene-heptane (20:80) for both. |
| I | Butadiene-acrylonitrile rubber. | Toluene. |
| J | Silicone elastomer [5] | Xylene. |
| K | Chlorosulfonated polyethylene elastomer. | Toluene. |

[1] Polyester of 1,4-butanediol and adipic acid chain extended with 4,4'-diphenylmethane diisocyanate (Estane 5740X1).
[2] Neopentylglycol-4,4'-isopropylidenebisphenol-adipate.
[3] 4,4-isopropylidenebisphenol-carbonate.
[4] Polyamide of a dibasic acid and polyamine reacted with epoxy terminated reaction product of epichlorohydrin and a bisphenol (Epon 1001-Versamid 100).
[5] Reduction step requires stirred neutral electrolyte.

Each of these compositions was used to coat a polycarbonate plaque as in Example 1. After electrochemically reducing the cadmium oxide to cadmium metal in the coatings and electroplating with copper, only compositions A, H, I, J and K gave adherent coatings of the plated metal. In all other cases, the copper metal was very easily pulled from the substrate showing that in order to get adherent coatings, an elastomeric material is necessary.

EXAMPLE 3

Four compositions were made up similar to composition A in Example 2, except in this case, the cadmium oxide was replaced with a conductive carbon black, cuprous oxide, lead sulfide and indium oxide. Since the carbon black would not be benefitted by a chemical reduction reaction, the chemical reduction was applied only to the other coatings. Of these, only the coating containing indium oxide was readily reduced to metal. All of the coatings could be satisfactorily copper plated, however those coatings containing the carbon black, cuprous oxide and lead sulfide started plating from the electrical connection and spread over the surface of the film, whereas the film initially containing indium oxide, after reduction, plated over the entire surface at once. The copper plating could be readily stripped from those samples in which the initial coating contained the conductive carbon, cuprous oxide and lead sulfide which was in marked contrast to the very adherent copper coating obtained on the coating which initially contained the indium oxide.

When attempts were made to substitute either $V_2O_3$ or $Ti_2O_3$, both of which are known to have metallic conductivity, in the above formulation, it was found that they could not be reduced to metal by electrochemical means, nor could they be plated with copper.

EXAMPLE 4

This example illustrates incorporating a curing agent for the elastomer into a coating composition. A solution was made by dissolving 100 g. of chloroprene elastomer in 650 g. of toluene and then 4 g. of magnesium oxide, 5 g. of zinc oxide, 2 g. of phenyl β-naphthylamine and 542 g. of cadmium oxide were dispersed. After these ingredients had been well dispersed, there was added, a slurry of 10 g. of litharge in 10 g. of toluene to give a composition which could be vulcanized by heating. This composition was used to coat a polycarbonate plaque. It was reduced and copper plated as in Example 1. Heating at 80° C., overnight caused the chloroprene elastomer to be vulcanized. The peel strength was 7 lbs. per inch. It was later noted that without the incorporation of a vulcanizing agent, that even the cadmium oxide or metal had apparently caused curing of the chloroprene polymer after heating, since after a peel test where failure occurred in the body of the elastomer (a cohesive failure), it was found that the polymer would not dissolve in solvents in which the chloroprene elastomer was initially soluble.

EXAMPLE 5

Other substrates, other than polycarbonates have been successfully copper plated by the compositions illustrated in the above examples. Illustrative of different substrates and the particular solvents and elastomers used in preparing metal compound elastomer dispersions are given in Table II.

TABLE II

| Substrate | Elastomer | Solvent |
|---|---|---|
| Poly(2,6-dimethyl-1,4-phenylene oxide). | Chloroprene | Chlorobenzene. |
| Poly(1,4-phenylene sulfone) | Polyurethane | Dioxane. |
| Acrylonitrile-butadiene-styrene terpolymer (ABS). | (a) Chloroprene | Toluene. |
| | (b) Polyurethane | Dioxane. |
| Polystyrene | (a) Chloroprene | Same solvent as in Example 1. |
| | (b) Butadiene-acrylonitrile copolymer. | Toluene. |
| Blend of poly(2,6-dimethyl-1,4-phenylene oxide) and polystyrene. | Chloroprene | Same solvent as in example 1. |
| Phenol-formaldehyde laminate | do | Do. |
| Polymethylmethacrylate | do | Do. |

EXAMPLE 6

Polycarbonate test plaques were coated with a 1 mil coating of the following paints where percentages are by weight as listed under columns A and B in Table III.

TABLE III

| | A | B |
|---|---|---|
| Cadmium oxide | 30.75 | 41.06 |
| Carbon black | 0.73 | 0.94 |
| Chloroprene elastomer | 7.25 | |
| Butadiene-acrylonitrile rubber (Hycar 1022) | | 8.00 |
| Xylene | | 46.24 |
| Toluene | 11.12 | |
| Acrylonitrile | | 3.76 |
| Benzene | 13.18 | |
| Monochlorobenzene | 8.50 | |
| Cylohexane | 28.47 | |

When these coatings without reduction were placed as the cathode in the alkaline copper cyanide plating bath, it was noted that the brown color of the coating became gray and then copper plated starting at the point of electrical contact and then spreading radially outward until the entire surface was copper plated. Viewing from the back side showed that the brown color of the coating was now gray with some copper color also showing, indicating that the copper plating had penetrated into the elastomer coating. This is also noted with the coatings that are reduced before plating but not to as high a degree. This penetration of the plated metal is also dependent on the rate of plating. Slower plating areas give deeper penetration.

EXAMPLE 7

This example illustrates that the use of the metal compound and then reducing before plating gives an entirely different result than that by starting with the free metal. Two glass plates were coated with a chloroprene elastomer solution in xylene containing 40 vol. percent cadmium oxide (based on the total volume of elastomer and oxide). After reduction of the metal oxide to metal, as previously described, one coating was dissolved off of the plate with xylene and the dispersion, used to recoat the glass plate. When these two coatings were copper plated, the reformed coating could not be plated whereas the other was readily plated with a very adherent coating of copper.

Two polycarbonate plaques were coated with the above cadmium oxide dispersion. One was reduced as previously described. Both were placed in an electroless copper plating solution (alkaline copper sulfate-tartrate complex-formaldehyde solution). The coating which had been reduced started to plate immediately with copper. The other coating was plated with copper after standing overnight. Both copper plates were very adherent to the substrate.

EXAMPLE 8

Several zinc oxide-chloroprene elastomer coating compositions were applied to an acrylonitrile-butadiene-styrene terpolymer (ABS) and to high impact polystyrene (PS) substrates. After drying, the zinc oxide was electrochemically reduced, as previously described, and the resulting surfaces were copper plated from an electroless copper bath. Separate test plaques coated with the last two compositions shown in Table IV, after electroreduction were also copper plated using a copper cyanide electroplating bath. There was no noticeable differences between the two processes. The initial copper layers were further electroplated in a bright acid copper bath to obtain a sufficiently thick metal layer for peel strength determinations. The compositions and results are shown in Table IV.

TABLE IV

| Coating composition (parts by weight) | | | | |
|---|---|---|---|---|
| Zinc oxide | Chloroprene elastomer | Solvent | Substrate | Peel strength (lbs./inch [1]) |
| [2] 100.0 | 32.0 | Toluene 168.0, benzene 70.2 | ABS | 6.1 |
| [2] 100.0 | 26.8 | Toluene 59.1, acetone 72.1, n-heptane 62.3. | PS | 8.4 |
| [3] 100.0 | 26.8 | Toluene 46.4, acetone 35.4, n-heptane 61.1, 1,4-dioxane 46.3. | ABS | 9.3 |
| [4] 100.0 | 26.9 | Toluene 211.1 | ABS | 5.1 |
| [4] 100.0 | 26.9 | Toluene 211.1, benzene 67.6 | ABS | 6.2 |

[1] Average of several determinations.
[2] Commercially available reagent grade ZnO, unknown particle size.
[3] Commerciallt available, ZnO particle size .20 μ.
[4] Commercially available, ZnO particle size .14 μ.

EXAMPLE 9

A coating composition containing 100.0 g. of zinc hydroxide, 60.0 g. of chloroprene elastomer and 600.0 g. of toluene was coated on a substrate of ABS. This test plaque was electrochemically reduced and plated as described in Example 8. A very adherent copper plate was obtained similar to those obtained with ZnO.

EXAMPLE 10

100.0 g. of lead oxide (litharge) was dispersed by ball milling in a solution of 15.8 g. of chloroprene elastomer in 161.0 g. of toluene. After application of this composition to an ABS substrate and evaporation of the solvent, the lead oxide was electrochemically reduced and plated as described in Example 8. The peel strength exceeded 5 lbs./inch.

Other metals have been readily plated either on the copper plate of the above examples, for example nickel, nickel followed by chromium, lead, etc., or on the conductive coatings directly.

In general, I have found that in making conductive coatings either to be used per se or to form a base on which a metal is to be plated that the coating should be thick enough that it will be opaque to transmitted light. This is readily determined by using a transparent substrate. In general, the coatings for such applications should be at least 0.5 mil in thickness.

It is of importance to remember that the volume measures of the amounts of metal oxide or hydroxide and elastomer are more significant than the weight ratios. The appropriate weight ratios of metal compound to elastomer can be estimated from the data in the examples by using the densities of the materials to calculate the weights of materials required. In this regard, it is to be kept in mind that the density is the true density and not the apparent density which is dependent on the degree of the subdivision of the particles.

The procedures in the above examples are not limited to the exact details given therein. Other elastomeric binders and the other specified metal hydroxides than those specifically illustrated likewise may be used, as well as other substrates with proper consideration being given to the choice of solvents from the known characteristics of solvent resistance of the particular substrate chosen and the solubility characteristics of the particular elastomer chosen. Metals other than copper can be plated either as the first metal to be plated or as additional plates on top of the prior metal plate. Holes drilled through a metal-clad laminate can have their walls coated with my compositions. The metal cladding on the laminate provides an easy method of providing electrical contact to each hole to reduce the metal compound in the coating to metal even though the metal cladding is or is not masked and then the walls of the holes plated, preferably after masking the cladding, to provide an electrical connection through the holes to the two metal surfaces. These and other modifications of this invention, which will be readily discerned by those skilled in the art, may be employed within the scope of the invention. The invention is intended to include all such modifications and variations as may be embraced within the following claims.

What I claim as new and desire to secure by Letters Patent of the United States is:

1. The process of making a metal coating on an electrically non-conductive substrate which comprises coating at least a portion of the surface of the non-conductive substrate with a composition comprising an elastomer having dispersed therein a metal compound selected from the group consisting of the oxides and hydroxides of cadmium, indium, zinc and lead (II), and mixtures thereof, the amount of said elastomer being sufficient to provide cohesive film-forming properties to the composition and the amount of said metal compound being sufficient that the metal compound in a film made from said composition can be electrolytically reduced to metal, and thereafter electrolytically reducing at least the surface of the metal compound on the surface of the coating to metal.

2. The process of claim 1 wherein the metal compound is a zinc compound.

3. The process of claim 1 wherein the metal compound is zinc oxide.

4. The process of claim 1 wherein the elastomer comprises a polymer of a 1,3-butadiene.

5. The process of claim 1 wherein the elastomer comprises a polymer of a 1,3-butadiene and the metal compound is a zinc compound.

6. The process of claim 1 wherein the elastomer comprises a polymer of a 1,3-butadiene and the metal compound is zinc oxide.

7. The process of claim 1 wherein after the reduction of the metal compound to metal, at least one other metal is plated on top of the metal in the coating by electroplating.

8. The process of claim 7 wherein the elastomer is a polymer of a 1,3-butadiene and the metal compound is a zinc compound.

9. The proces of claim 7 wherein the elastomer is a polymer of a 1,3-butadiene and the metal compound is zinc oxide.

10. The process of claim 7 wherein the elastomer is a polymer of a 1,3-butadiene, the metal compound is zinc oxide and the plated metal is copper.

11. The process of claim 1 wherein after the reduction of the metal compound to metal, at least one other metal is plated on top of the metal in the coating.

12. The process of claim 11 wherein the metal is plated by electroless plating.

13. The product produced by the process of claim 11.

14. The product produced by claim 1.

References Cited
UNITED STATES PATENTS

| | | | |
|---|---|---|---|
| 3,138,547 | 6/1964 | Clark | 117—201 |
| 3,226,256 | 12/1965 | Schneble, Jr. et al. | 117—217 X |
| 3,523,824 | 8/1970 | Powers et al. | 117—217 X |
| 2,893,891 | 7/1959 | Bradstreet et al. | 117—62 |
| 3,014,818 | 12/1961 | Campbell | 117—227 |
| 3,171,757 | 3/1965 | Duddy | 117—227 UX |

CAMERON K. WEIFFENBACH, Primary Examiner

U.S. Cl. X.R.

117—71 R, 201, 212, 217, 227; 204—22, 29, 38B, 130